United States Patent

[11] 3,599,508

| | | |
|---|---|---|
| [72] | Inventor | Ray S. Richmond<br>Placitas, N. Mex. |
| [21] | Appl. No. | 32,016 |
| [22] | Filed | Apr. 27, 1970 |
| [45] | Patented | Aug. 17, 1971 |
| [73] | Assignee | The Singer Company<br>New York, N.Y. |

[54] POWER TRANSMISSION SYSTEM
9 Claims, 3 Drawing Figs.

[52] U.S. Cl.......................................................... 74/491,
    74/523
[51] Int. Cl........................................................ G05g 1/04
[50] Field of Search........................................... 74/491,
    519, 523, 543

[56] References Cited
UNITED STATES PATENTS
3,208,299  9/1965  Leonard et al................ 74/491

3,382,733  5/1968  Miller et al.................... 74/491 X

*Primary Examiner*—Milton Kaufman
*Attorneys*—Patrick J. Schlesinger, Charles R. Lepchinsky and Jay M. Cantor ABSTRACT: An energy storage mechanism provides maximum torque near the rest end of the stroke of a crank arm in a drive mechanism. A double extended arm is carried on one shaft controlled by the crank arm while a second double extended arm is carried by a driven shaft. A coil spring is supported between the two arms on one side of the axes of the two shafts while the other two opposed arms are connected by a link on the other side of the axes of the shafts. The one opposed, or moment, arm actuated by the crank arm is longer than the other so that the rocking of the crank arm preloads the coil spring to provide sufficient restoring torque.

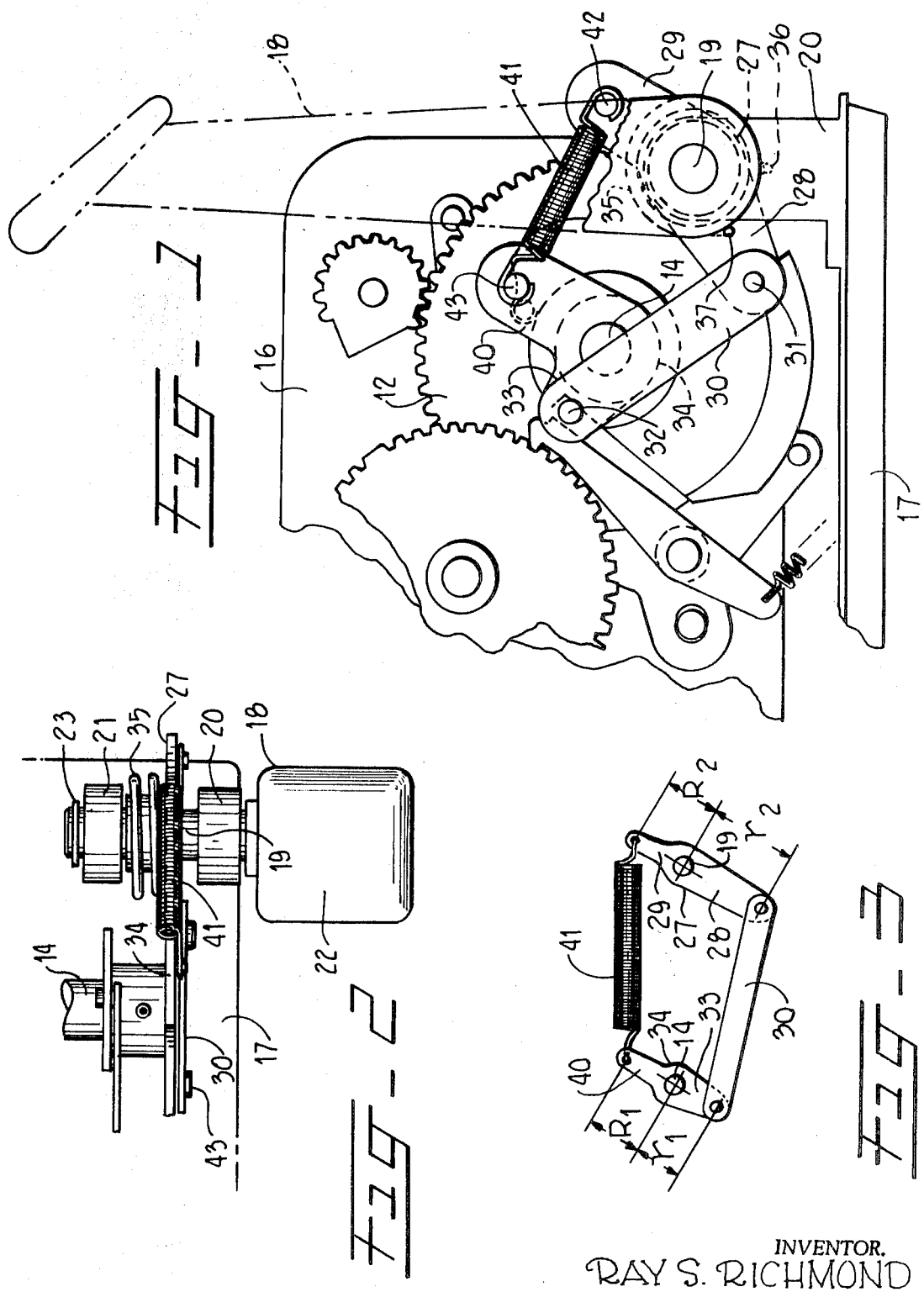
INVENTOR.
RAY S. RICHMOND

3,599,508

POWER TRANSMISSION SYSTEM

BACKGROUND OF THE INVENTION

1. Field of the Invention

The present invention relates to a crank arm controlled rotary drive system in which the crank arm is limited to a small angular movement while a greater angular rotation of the driven shaft is required.

2. Description of the Prior Art

In prior art devices employing the combination wherein a given throw of the crank arm provides a greater angular movement of the driven mechanism, a greater load is imposed on either the torsion-type spring or the tension spring for the restoration of the crank arm to its normally inactive position. In order to ensure a complete restoration of the parts, a heavier torsion spring or a heavier coil spring may be employed, either of which would impose a greater load on the crank arm.

SUMMARY OF THE INVENTION

These and other problems of the prior art are overcome by the present invention in a power transmission system having a driving shaft and a driven shaft. A crank arm is carried by the driving shaft operable to impart a given angular rotation to the shaft. Means actuated by the crank arm effects a predetermined angular rotation of the driven shaft greater than that of the driving shaft. Normally, the crank arm is biased to an at rest position by a biasing means. A resilient member is secured at its respective ends to each of a pair of support members, one of said members being carried by the driving shaft and the other member being carried by the driven shaft. Upon operation of the crank arm, the resilient member is extended so that as the crank arm is released, the extended resilient member supplements the torque requirement of the biasing means to fully restore the crank arm and two shafts to the "at rest" position.

DESCRIPTION OF THE DRAWINGS

Other advantages of the invention will become apparent from the following detailed description taken in conjunction with the accompanying drawing, wherein:

FIG. 1 is a fragmentary elevational view of the machine showing the drive mechanism;

FIG. 2 is a plan view of the drive mechanism; and

FIG. 3 is a schematic showing the driving and driven members.

DESCRIPTION OF A PREFERRED EMBODIMENT OF THE INVENTION

The present invention is preferably shown embodied in a hand-operated postage-metering machine of the type disclosed in U.S. Pat. No. 3,469,777 issued to M. E. Anderson et al., Sept. 30, 1969. In such a machine, postage indicia is adapted to be imprinted on letters, in accordance with preselected values, and the value imprinted is accumulated in an ascending register and subtracted from the amount of prepaid postage in a descending register.

In order to control each machine cycle of operation, a segmental gear 12 is rotated approximately 120° counterclockwise from the normal "at rest" position shown in FIG. 1. Gear 12 is secured on a shaft 14 extending transversely of the machine and suitably journaled in each of a pair of frame members, similar to frame member 16, spaced apart in parallel relationship and secured in position on a base member 17.

A driving means is provided for controlling the angular rotation of the gear 12 and includes a crank arm 18 secured on a stub shaft 19 journaled in a pair of spaced parallel upright arms 20 and 21 integrally formed on the base member 17. The shaft 19, on which the crank arm 18 is secured, is retained in place against axial movement in the supporting arms 20 and 21 by means of a clip, or C-ring, 23 engaged in a suitable annular groove in one end of the shaft. Normally, the crank arm 18 is in the vertical position indicated by phantom line in FIG. 1 and is provided with a head portion 22 extending laterally therefrom. The head 22 is angularly disposed with reference to the horizontal in the "at rest" position of the crank arm 18 sloping downwardly to the right in FIG. 1, so that as the crank arm is rocked counterclockwise, pressure may be more easily applied to complete the operating stroke.

Although the segmental gear 12 is rotated approximately 120° counterclockwise to complete a cycle of machine operation, a lesser angular stroke of the crank arm 18 is desired. In the present embodiment, an angular stroke of approximately 70° of the crank arm is employed. In order to control the angular rotation of the gear 12 by the operating stroke of the crank arm 18, a lever arm or bellcrank 27 is secured on shaft 19 between supporting arms 20 and 21. One arm 28 of the bellcrank 27 extends below the axis of the shaft 19 while the other arm 29 of the bellcrank extends above the axis of the shaft. At its one end, a link 30 is pivotally connected at 31 on the arm 28 of bellcrank 27 and, at its other end, is pivotally supported at 32 on an arm 33 of a bellcrank 34 secured on shaft 14. The axes of the pivotal connections 31 and 32 are below a centerline through the axes of the shafts 14 and 19. For the required 120° angular rotation of the crank arm 18 with the radius $r_1$ of the arm 33 given (FIG. 3), the radius $r_2$ of the arm 28 may be determined in the following manner:

$$r_2 = \frac{\text{angular rotation in degrees of driven member}}{\text{angular rotation in degrees of drive member}} r_1$$

or $$r_2 = \frac{120°}{70°} r_1$$

Normally, crank arm 18 is biased to the "at rest" position, shown in phantom line in FIG. 1, by a torsion spring 35 loosely coiled in a counterclockwise direction about the hub of bellcrank 27. At its one end, the spring 35 is secured at 36 in a suitable aperture in supporting arm 21 having its other end positioned in an aperture 37 in arm 28 of bellcrank 27. In order to return not only the crank arm 18 but also the mechanism driven by the gear segment 12 to an "at rest" or inactive position, a relatively strong torsion spring would be required. The stronger the spring, the more energy is required to actuate the crank arm 18 for an operation of the machine.

In order to make possible the use of a lighter torsion spring, auxiliary spring means are brought into play to assist the torsion spring in its function to return the parts to the inactive position. Such auxiliary spring means is extendible as the two bellcranks 27 and 34 are actuated providing sufficient torque near the rest end of the return stroke to ensure restoration of the parts to the "at rest" position.

For this purpose, arm 29 of bellcrank 27 extends upwardly from a plane through the axes of the shafts 14 and 19. Similarly, an arm 40 of the bellcrank 34 extends upwardly from such a plane and parallel to arm 29. Supported between the arms 29 and 40 is a coil spring 41, secured at its one end on a pin 42 on arm 29 and at its other end on a pin 43 on arm 40, the radii $R_1$ and $R_2$ (FIG. 3) of the respective arms 40 and 29 being equal. As the crank arm 18 is rocked counterclockwise from the "at rest" position, indicated by phantom line in FIG. 1, bellcrank 27 is effective to impart a progressively greater angular rotation to bellcrank 34 due to the ratio of radius $r_2$ to radius $r_1$ in FIG. 3. During the rocking of the crank arm 18, the coil spring 41 tends to move with the rotation of the shafts 14 and 19 and is gradually extended to a length predetermined only by different mounting radii for the spring 41 and the difference in the angular rotations of the shafts 14 and 19.

For a given angular rotation of the crank arm shaft 19 and a greater angular rotation of the driven shaft 14 resulting therefrom, the torque induced by the spring 41 may be increased or decreased. To this end, a mounting radius is provided on arm 40 which is greater or lesser, respectively, than that on the arm 29, the spring 41 being identical in each instance.

Upon release of the crank arm 18 to the influence of its torsion spring 35, the torque induced by the extended coil spring 41 reaches its maximum near the "at rest" end of the return stroke to ensure return of all parts to the normally inactive position.

What I claim is:

1. In a power transmission system,
a driving shaft,
a driven shaft,
a crank means movable from a normally inoperative to an operative position for imparting a given angular rotation to said driving shaft,
means normally biasing said crank means and said driving shaft to the inoperative position,
means actuated by said crank means for controlling a predetermined angular rotation of said driven shaft greater than the angular rotation of said driving shaft, and
a resilient member extendable by said actuated means upon operation of said crank means to supplement the torque requirement of said biasing means for the return of said crank means to the inoperative position.

2. In a device of the character described in claim 1 wherein said crank means comprises a crank arm mounted on said driving shaft rockable a given angular extent for controlling operation of said actuated means.

3. In a device of the character described in claim 2 wherein said actuated means comprises:
a first lever mounted on said driving shaft,
a second lever mounted on said driven shaft, each of said levers having a pair of arms, one arm on either side of a centerline through the axes of said driving and said driven shafts, one arm of each of said levers supporting said resilient member therebetween on one side of said centerline, and
a link member operatively connecting the other of said arms of said levers on the other side of said centerline, the mounting radius for the link member on the said other arm of said first lever being greater than the mounting radius on the said other arm of said second lever whereby the predetermined angular rotation of said driven shaft is greater than the angular rotation of said driving shaft to cause an extension of said resilient member upon rocking of said crank arm to the operative position thereby supplementing the torque requirement of said biasing means.

4. In a device of the character described in claim 3 wherein said resilient member is a coil spring having its respective ends supported on said one arm of each of said levers, the mounting radii for each end of said spring being at least equal.

5. In a device of the character described in claim 3 wherein said biasing means is a torsion spring normally biasing said crank arm to the inoperative position.

6. In a power transmission system,
a driving shaft,
a driven shaft,
a crank arm movable from a normally inoperative to an operative position for imparting a given angular rotation to said driving shaft,
means actuated by said crank arm for controlling a predetermined angular rotation of said driven shaft greater than the angular rotation of said driving shaft,
a first support means carried by said driving shaft for angular rotation therewith,
a second support means mounted on said driven shaft for rotation by said actuated means,
means normally biasing said crank arm and said driving shaft to the inoperative position, and
a resilient member supported between said first and said second support means extendable upon operation of said crank arm to supplement the torque requirement of said biasing means for the return of said crank arm to the inoperative position.

7. In a device of the character described in claim 6 wherein said actuated means comprises:
a first lever arm mounted on said driving shaft,
a second lever arm mounted on said driven shaft, and
a link member operatively connecting said first arm and said second arm, the mounting radius for the link on said first arm being greater than the mounting radius on said second arm whereby the predetermined angular rotation of said driven shaft is greater than the angular rotation of said driving shaft to effect an extension of said resilient member upon rocking of said crank arm to an operative position.

8. In a device of the character described in claim 7 wherein said resilient member is a coil spring having its respective ends secured to said first and said second support means, the mounting radii for the ends of said spring being equal.

9. In a device of the character described in claim 8 wherein said first support means forms a radially extended portion of said first lever arm and said second support means forms a radially extended portion of said second lever arm, each of said extended portions of said lever arms supporting said spring on one side of a centerline through the axes of said shafts in opposition to the mounting of said link member.